(12) United States Patent
Altemare, Jr. et al.

(10) Patent No.: US 8,550,620 B2
(45) Date of Patent: Oct. 8, 2013

(54) FRAME HINGE AND SIDE ARM, EYEGLASS FRAME WITH MULTIPLE WEARER CONNECTIONS AND IMPROVED SPECTACLE KIT

(76) Inventors: Kenneth D. Altemare, Jr., Land O Lakes, FL (US); Christopher J. Altemare, Land O Lakes, FL (US)

( * ) Notice: Subject to any disclaimer, the term of this patent is extended or adjusted under 35 U.S.C. 154(b) by 194 days.

(21) Appl. No.: 13/065,308

(22) Filed: Mar. 19, 2011

(65) Prior Publication Data
US 2012/0236253 A1   Sep. 20, 2012

(51) Int. Cl.
*G02C 5/22* (2006.01)
*G02C 9/00* (2006.01)

(52) U.S. Cl.
CPC ........... *G02C 5/2209* (2013.01); *G02C 9/00* (2013.01)
USPC .............. 351/153; 351/121; 351/158; 16/228

(58) Field of Classification Search
CPC .................................. G02C 5/2209; G02C 9/00
USPC ........... 351/43, 111, 119, 121, 155, 156, 158, 351/153; 16/228; 2/426, 444
See application file for complete search history.

(56) References Cited

U.S. PATENT DOCUMENTS

| | | | | |
|---|---|---|---|---|
| 4,153,347 A | * | 5/1979 | Myer | 351/90 |
| 4,780,928 A | * | 11/1988 | De Lorenzo Poz | 16/228 |
| 2010/0091237 A1 | * | 4/2010 | Medana | 351/153 |

* cited by examiner

*Primary Examiner* — Huy K Mai
(74) *Attorney, Agent, or Firm* — Gary P. Topolosky

(57) ABSTRACT

A spectacle kit is disclosed having a protective mask insert and detachable means for attaching a spectacle frame to the protective mask insert, by snapping the receiver onto an insert clip. Notch attachments connect a holding strap at each horizontal end of the spectacle frame so that the spectacle kit can be worn around the wearer's head external from the protective mask. Each front piece end also has a hinge and side arm combination, each hinge having a back wall, top region, bottom region and connector pin between that forms an arcuate-shaped gap between each back wall and connector pin. Each side arm for that hinge comprises an elongate side that terminates in a region fitting over the wearer's ear; and an arcuate region for fitting into the gap between the hinge back wall and connector pin when: (i) positioned at an angle between about 20 and 75 degrees relative to the main frame body; (ii) slid into the gap; and (iii) rotated about the connector pin away from the main frame.

20 Claims, 13 Drawing Sheets

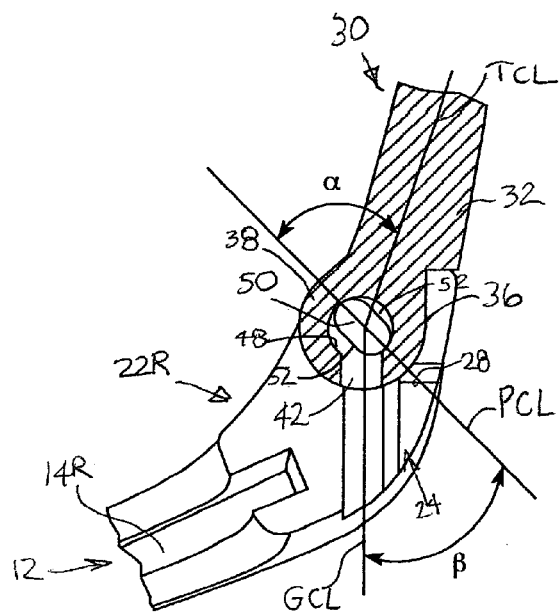
FIG. 7
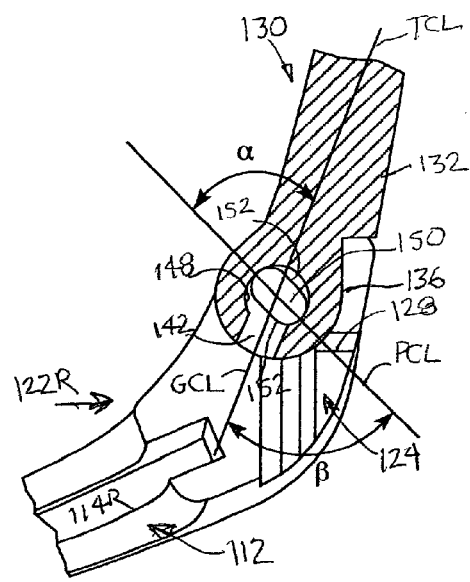
FIG. 7A1
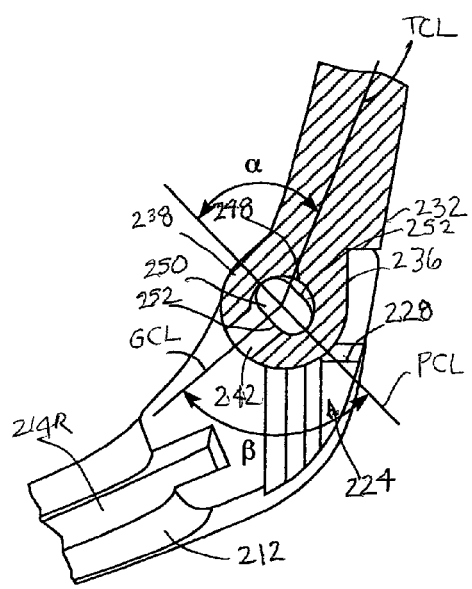
FIG. 7A2

FRAME HINGE AND SIDE ARM, EYEGLASS FRAME WITH MULTIPLE WEARER CONNECTIONS AND IMPROVED SPECTACLE KIT

CROSS-REFERENCE TO RELATED APPLICATION

This application claims priority to U.S. Provisional Application Ser. No. 61/340,541, filed on Mar. 18, 2010 and entitled "Frame Hinge and Side Arm, Eyeglass Frame with Multiple Wearer Connections and Improved Spectacle Kit Using Same", the disclosure of which is fully incorporated by reference herein.

BACKGROUND OF THE INVENTION

1. Technical Field

This invention relates to eyeglass frame hinges. The invention also relates to frames that provide their wearers with multiple wearing choices/options, i.e. both in and outside of a safety mask, with or without added safety shields and with side temple arms, head straps or both. More specifically, the invention relates to improved spectacle kits for protective masks.

2. Background

Firemen, safety and rescue personnel, and industrial professionals often require protective masks or Self Contained Breathing Apparatus (SCBA). Such masks are needed when entering a hazardous environment such as a burning structure or an area known or suspected of containing a caustic, chemical gas. Some sports also require protective masks like those used in underwater diving.

A person requiring corrective optical lenses must be able to use his/her lenses while wearing a protective mask. The use of contact lenses while wearing a mask is impractical because most contacts today are soft lenses manufactured from materials containing 38% by weight or more water. Such soft lenses are easily contaminated by smoke and/or chemicals making them uncomfortable to wear or structurally damaging same.

A typical spectacle kit includes framed optical lens structures supported on the nose or face, more commonly called eyeglasses. Many of today's kits use thermo plastic lenses, e.g., CR39 monomer polycarbonate lenses, to provide vision correction to a given prescription.

Spectacle kits are needed for those who have to wear protective masks while requiring corrective optical lenses. One method used in the past, including by the military, connects lens frames by a hinged nosepiece for holding the eyeglasses in the mask proper. A second method attaches a support structure to a back block rigidly mounted inside a facemask. Those lens frames can be removed by pulling the whole unit out of the mask.

SUMMARY OF THE INVENTION

Before introduction of the spectacle kit from U.S. Pat. No. 6,019,468, commercially available kits for protective masks had several disadvantages. Such kits included many parts requiring customized wear manipulations. And in an emergency, when many such masks are worn, a user does not have "the spare time" to manipulate multiple mask components.

Another disadvantage is that some known kits require using smaller lens frames which tend to reduce the user's peripheral vision. Still other kits employ a suction cup directly on the mask's faceplate. Many times, that cup does not retain suction but rather dislodges after a short time period rendering the mask wearer/user helpless. Another type of kit cements a glass frame holder to the mask interior. But those mounts prevent the user from removing his/her glasses for use outside of the mask.

In some instances, a facemask is not always worn by the same individual. A volunteer fire department, for example, may have only a limited number of masks for sharing among several persons for whom only some may require corrective lenses.

Yet another disadvantage arises when a user removes his/her mask with their permanently mounted spectacle kit inside. That user is forced to locate his/her second set of glasses . . . worse, without vision-correcting assistance. And when that user removes said glasses for donning his/her mask, there's the added concern of storing the second frame set in a protective location where they won't get scratched or broken.

In many emergencies, situations require the wearer to put on a protective mask with little to no advance notice. When such an emergency situation arises, the mask user/wearer has to manipulate and think about many items. A safety spectacle kit which lets mask wearers concern themselves with fewer personal safety items to manipulate enables their focusing on other safety matters of broader significance. Any kit that provides quick and easy vision correction for both in and outside a protective mask would be most beneficial.

A detachable kit is needed for using/wearing glasses in a protective mask. A more universal kit should provide wearers with several use options, including with or without safety shields, outside the mask. And any such kit should not negatively impact the mask's respiration seal so critical to making these masks life-saving.

It is an object of this invention to provide improvements for protective masks worn by persons who also need to wear prescription lenses.

It is a main object to provide eyeglass frames with readily detachable side temple arms. Ideally, those arms can be stored together (i.e., against one another) when not in use for less risk of loss.

It is another object to provide eyeglass frame hinges which accommodate repeated temple arm attachment and disconnection. Most preferably, these hinge sets can be incorporated into the other aspects of U.S. Pat. No. 6,019,468.

It is another object to provide means for inserting removable side arm temples into and out of the front corners of an eyeglass frame without hassle or fear of losing component pieces.

It is a further object of the present invention to provide a universal spectacle kit for use in or outside a protective mask, and with or without supplemental safety means (i.e., full or side shields). It is another object to provide eyeglass frames and spectacle kits which simpler means for using prescription or non-prescription lenses in protective masks and other Self Contained Breathing Apparatus (SCBA).

It is yet another object to provide a detachable spectacle kit with greater eyeglass frame interchangeability so that multiple users may be able to use the same protective mask.

These and other objects/features/advantages of this invention will become clearer from the detailed description of preferred embodiments below.

One article of this invention comprises a spectacle front or frame that houses two lenses with a center bridge between. Ideally, that center bridge has an outward curve or protrusion. The frame also includes an aperture/receiver for enabling insertion into a typical protective safety mask that has a centrally located clip for firmly holding an eyeglass frame therein. The main improvement herein provides side temple arms that can be repeatedly inserted into and removed from the corner hinges of this frame so that the same spectacle set may be worn outside the mask. Preferred embodiments include a notch/recess at the frame corners into which a holding strap may be temporarily connected. Preferably, the foregoing arrangement may also accommodate adding full or partial side safety shields about this version of multiple function eyeglass frame.

In one embodiment, the holding strap is elastic. In another, it is made with adjustable clips/brackets. In yet another, the strap can be made in sections, with one strap end attached to each frame corner and both straps being joined together behind the wearer's head with clips, rivets, snaps, Velcro interconnects or combinations. If desired, the same glass frame can be worn outside the wearer's mask with the aforementioned strap connect either with or without temple arms included.

With the present invention, there is a main lens frame with a center aperture for connecting through and/or onto a safety mask. Preferably, that frame includes an ability to incorporate safety shield "wrap arounds" when not affixed to a mask interior. Such shields may be one piece, side shields at either frame corner, or a full shield that covers the entire frame front. Optionally, safety shields may connect to both frame front and sides. When adding side only shields, the connected shields may overlay the frame with full or just partial coverage (i.e., protection) of the prescription lenses contained therein. Yet another alternative would employ separate left and right safety shield additions to the universal front piece/frame described.

In any event, the goal is provide maximum flexibility and interchangeability for the mask wearer's own prescription and comfort level, particularly within the confines of his/her safety protection mask. Thereafter, this invention should convert via add-on side temples, strap connects, or both for enabling the mask wearer to use his or her own glass frames outside the mask, with or without various safety shields added.

BRIEF DESCRIPTION OF THE DRAWINGS

Further features, objectives and advantages of the present invention will become clearer when referring to the following detailed description made with reference to the drawings in which:

FIG. 7 is an exploded view of the circle marked "VII" in FIG. 6 with relative frame angles added;

FIG. 7A1 is a first alternative to the hinge-side temple arm configuration of FIG. 7 with different relative angles;

FIG. 7A2 is a second alternative to the hinge-side temple arm of FIGS. 7 and 7A1;

DETAILED DESCRIPTION OF PREFERRED EMBODIMENTS

Figure 1:
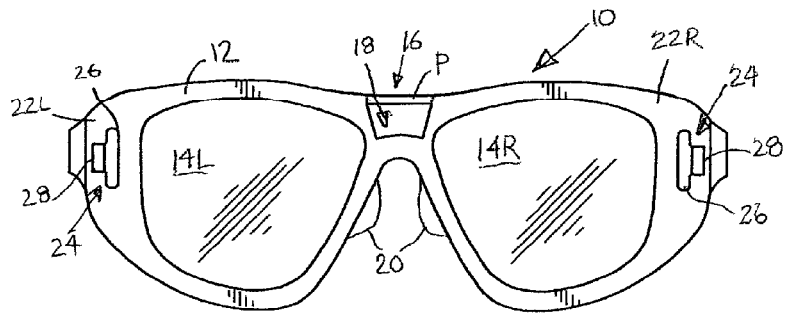
FIG. 1 is a front plan view of one embodiment of eyeglass frame according to this invention.

Common features in the different views of this invention are shown with the same reference numeral(s). For alternate embodiments of the same component, there is consistent numbering though in the next hundred series. When referring to any numerical range herein, it should be noted that all numbers within the range, including every fraction or decimal between its stated minimum and maximum, are considered to be fully designated and disclosed hereby. As such, disclosing an angle of insertion between about 20 and 75 degrees would expressly cover all other insertion angles from 21, 22, 23, 24 and 25 degrees up to and including about 73.5, 74 and 74.75 degrees.

The improved spectacle kit of this invention provides eyewear for use both in and outside of conventional, commercially available full-face respirators and Self Contained Breathing Apparatus (SCBA). The spectacle kit includes a front frame piece having an appropriately constructed bridge with an appropriately constructed nosepiece attached. That front piece houses vision-correcting lenses and provides a generously wide field of view. Small notched attachments, located at the frame corners, hold elasticized straps for enabling easy, comfortable attachment about a wearer's head for vision correcting outside the mask.

The present invention offers many advantages over currently existing kits. It provides worry-free access to fires and other emergency situations for firemen, paramedics and/or servicemen who need to wear corrective eyewear while still wearing necessary respiration equipment. With this kit, the glass frame wearer may quickly and easily transition to use their same corrective lenses outside the mask. The kit is cost effective for use with the masks of many fire, safety and rescue units.

The front piece of this improvement provides a large field of view that increases the wearer's range of peripheral vision without compromising on his/her prescription for correction. Prior art front pieces were limited to 48 mm. By contrast, this front piece has broader visibility of about 50 mm or more.

The frame front includes nose rests or a saddle bridge over the wearer's nose for comfort. In addition, this frame includes unique, directional hinge ends into which temple side arms may be temporarily connected and disconnected. On the frame exterior, there are also recesses into which one or more elastic straps may be attached. Either of these allow for wearing the glass frame outside of any protective mask.

In one embodiment, a pliable insert of nylon or other suitable plastic may be inserted into most typical protective gear masks. That insert receives the front piece (or frame) as a snap-on fit for snug attachment to the mask interior. The front piece, itself, may be quickly and easily snapped on or off the frame. Once removed from the mask, this front piece/frame can be positioned on the wearer's face using an elastic strap about the head as yet another option to a pair of side temple arms. Both options work efficiently. And once removed from the mask, this invention allows for the rapid, easy connection of external safety shields, either full front or partial side shields.

Corrective lens frames should snap easily onto this mask insert. There, they can be held firmly in place for a tight tension-mounted, press fit. Such an insert can be left in/on the mask even when not in use. It will not impair or otherwise interfere with the mask wearer's vision. When left in place, the insert would allow other wearers of the same (shared) mask to connect their own specialized frames inside.

After removal from the mask, the glass frame of this invention can be worn like conventional spectacles after side temple arms are angularly inserted into special hinges at opposed frame ends. Alternately, an elastic strap may be affixed to one or both frame ends, or to specially adapted full/side safety shields situated directly these frame ends. That strap would create an adjustable band for fitting snugly around the wearer's head. If need be, this strap can remain on the frame and merely tucked down one side of the mask without undue discomfort to the wearer/user.

The spectacle kit insert of this invention may be left inside various protective masks of a fire or safety department without impairing wearer/user vision. This universal aspect makes it attractive for those departments where the same mask may have to be worn by various individuals (i.e., whoever is on the shift when a call comes in). But for every individual, the same mask can accommodate front pieces having lenses customized for each wearer's proper vision correction (or prescription). Ideally, each customized kit, if not worn outside the mask, may be secured by the user or within the department until its next use.

One version of protective mask insert is constructed in two sizes, small and large. The small insert has dimensions of about 6 inches wide, about 2 inches high on each side and a thickness of about 0.100 inches. It is proportioned to fit inside the smaller SCBA masks like those made and sold by Mine Safety Appliances in Pittsburgh, Pa., and the Draeger Company, also based in Pittsburgh, Pa. A larger variety of insert measures about 7 inches wide and about 1 inch high on each side with a thickness of about 0.100 inches. It is proportioned to fit inside the larger masks such as the MSA Elite model made by Mine Safety Appliances and/or those larger varieties made and sold by Scott Health and Safety of Monroe, N.C.

These protective mask inserts are preferably made from nylon or polycarbonate in a smoke gray or crystal color. Other optional colors include tan, black, flesh-tone and crystal gray.

The present invention includes means for quickly connecting to and detaching from the gas masks, full respirators, and self contained breathing apparatus used professionally by firefighters, chemical workers, miners or the like. The invention provides a large enough field of view to include peripherals without compromising one's eyeglass prescription.

The ability to transition from one mask to another, e.g., "in the time of battle" as when fighting a fire can be critical. Fixedly mounted inserts cannot be removed when one gas mask goes bad or when a face shield melts or degrades in some way. The spectacle kit of this invention can be quickly, easily and completely switched from one safety mask to another.

The spectacle kit of this invention comprises two main structural parts, a frame front and insert piece, both of which are easily inserted and removed from most protective masks. The frame front is larger for enhanced peripheral vision and houses two corrective optical lenses having the user's prescription for proper vision inside the mask. The frame front housing the corrective optical lenses can be removed from the mask and worn as a safety pair of spectacles by adding the side temple arms thereto, or by using a strap to form a secure fit around the user's head. Preferably, the side temple arms of this invention interlock when not in use so as to lessen their chances of being lost or misplaced.

Referring now to accompanying FIGS. 1-5, there is shown a spectacle kit, generally 10, consisting primarily of a front piece or eyeglass main frame 12 into which are inserted a left corrective lens 14L and right lens 14R. Separating the two lenses is a connecting center bridge 16 with its top protrusion P to which outer safety shields may be attached as hereinafter described. Directly beneath bridge 16 is an aperture 18 through which one or more inserts may be extended when the frame of this invention is affixed to a protective mask interior.

On either side of the frame's wearer's nose, there would be positioned a pair of nose rests 20. They can be made from various materials as would best accommodate the space constraints and temperature/harsh chemical exposures experienced by most first responder/emergency technicians (firemen and the like). While one set of nose rests is repeatedly shown in the accompanying FIGS., it is to be understood that other known or subsequently developed varieties of same may be substituted therefor or even used to supplement same.

The typical glass frame 12 will have frame corners 22L and 22R at opposed ends. On an upper exterior portion of each corner, there is shown a notched recess, generally 24. In this instance, one preferred recess is substantially T-shaped at its front end 26 and extends through an elongated channel before terminating in a recess or rest stop 28 at the opposite end. While many of the accompanying drawings depict a T-shaped recess, it is to be understood that other shapes and sizes may be substituted for same. Alternatively, though on a less preferred basis, a series of protrusions, notches and/or nipples (not shown) may also be used for strap connections in other variations of this same invention.

As is typically the case for most corrective eyewear, the frame 12 of this invention is intended to include a pair of side temple arms 30, each arm running from a forward facing hinge end 32 and terminating with an opposite end that rests at, near, or most often, over the glass wearer's ear 34. But, unlike any other frames of the past, preferred embodiments of this invention include significant modifications to the hinge ends 32 of these temple arms 30.

Figure 6:
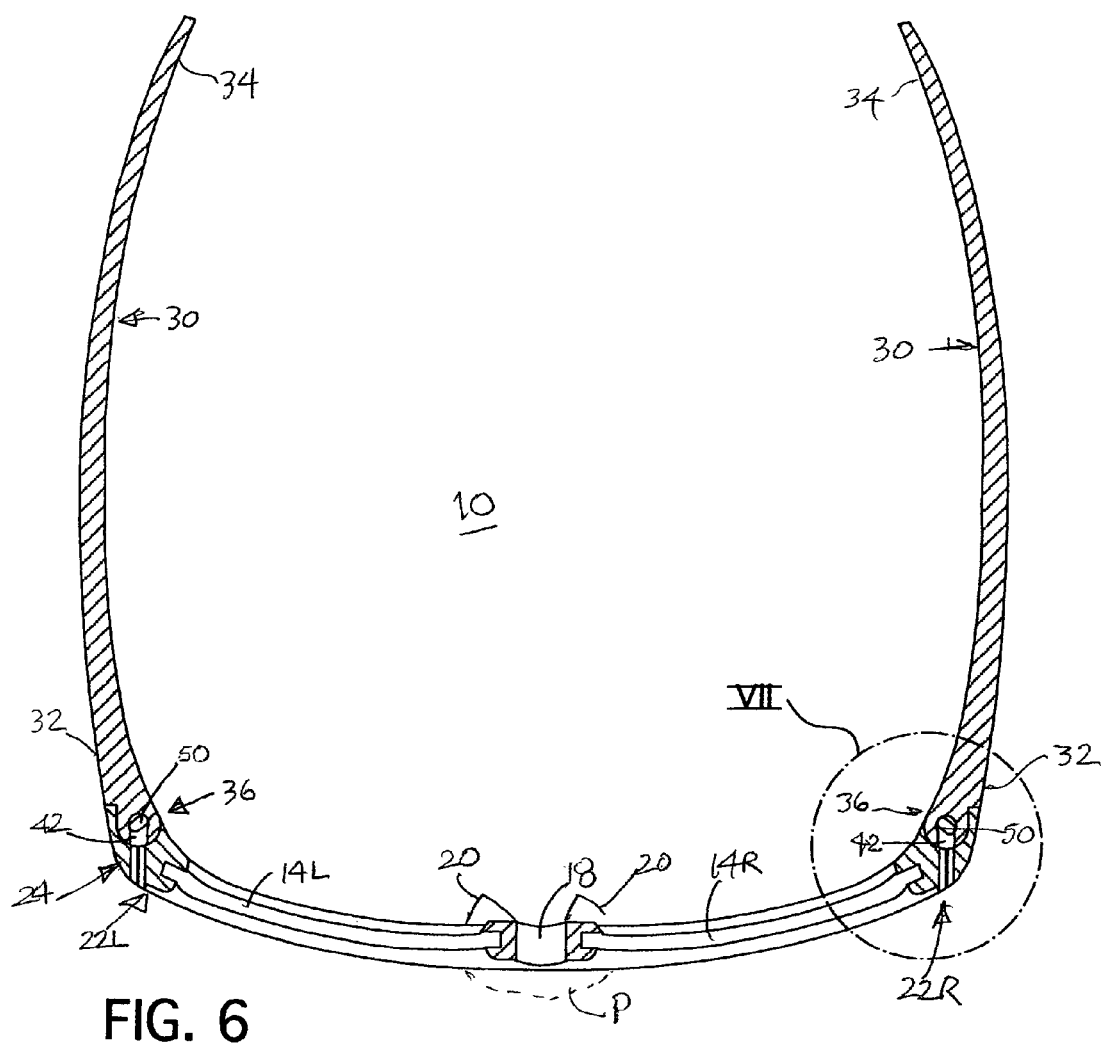
FIG. 6 is a cross sectional view of the glass frame as would be seen from lines VI-VI in FIG. 3.

FIGS. 6 and 7 focus on one preferred embodiment in which both temple hinge ends 32 include a female connector component 36. That connector 36 comprises an arcuate region 38 with an inner circle 40. Preferably, that arcuate element makes only a partial circle (when viewed in cross-section), more than about 55% of a circle and, even more preferably, greater than about 70 to 75% of a circle which by its very definition results in a defined circle gap 42. As described later herein, that gap 42, on the female connector 36 of each temple arm is what serves as the directionally driven, hinge connection means that enables repeated connections to and disconnections from the remainder of this eyeglass frame assembly.

Opposite the female connector 36, the frame end (22L or R) will have at its interior, a corresponding male hinge component with its own visibly distinct back wall element 44, top region 46 and bottom region 48, the latter two sandwiching a central connector pin 50. Preferably, that pin is columnar in shape, but it may also include one or more flat walled components 52.

Referring to FIG. 7, there is shown one preferred interrelationship between the female connector elements of a side temple arm with the frame end of this invention. In particular, notice the angle α that exists in every instance between the imaginary center line running through the temple arm's main body, (temple center line, or "TCL") and the corresponding connector pin imaginary center line, or pin center line "PCL"). Preferably, the connector pin is kept at about a 35 to 50 degree angle relative to the TCL; more preferably at about 45 degrees. Compare that with the imaginary center line through the female connector's gap (or gap center line "GCL") and one can calculate a second angle β that approximates the degree to which each temple arm 30 will need to be rotated for proper alignment with the main frame's connector pin 50 before it may be safely inserted into the spectacle kit's removable hinge assembly, followed by safe rotation (without tight, snap fitting) in the proper direction (away from the main body for temple installation; and towards that same body when un-installing each temple arm hereby).

In FIG. 7, the preferred beta β angle is kept between about 30 and 60 degrees, preferably between about 40 to 50 degrees and, most preferably at about 45 degrees (though the actually drawn angle may not accurately depict same). In the alternate embodiments, though, still other beta angles are taken into consideration. For instance, FIG. 7A1 shows a more acute angle than that required by FIG. 7 since angles alpha and beta are more consistent therein. As such, less angling of temple arm 130 would be needed (as compared to the angling of arm 30 in FIG. 7) before it may be safely inserted into the hinge connector of frame region 122R in FIG. 7A1.

Figure 2:
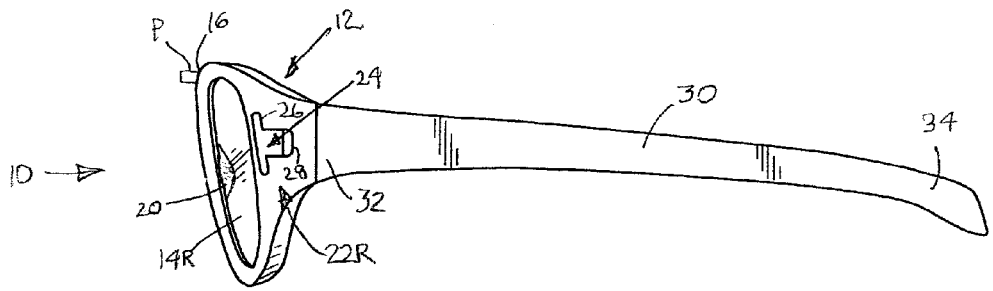
FIG. 2 is a left side view of the frame from FIG. 1.
Figure 3:
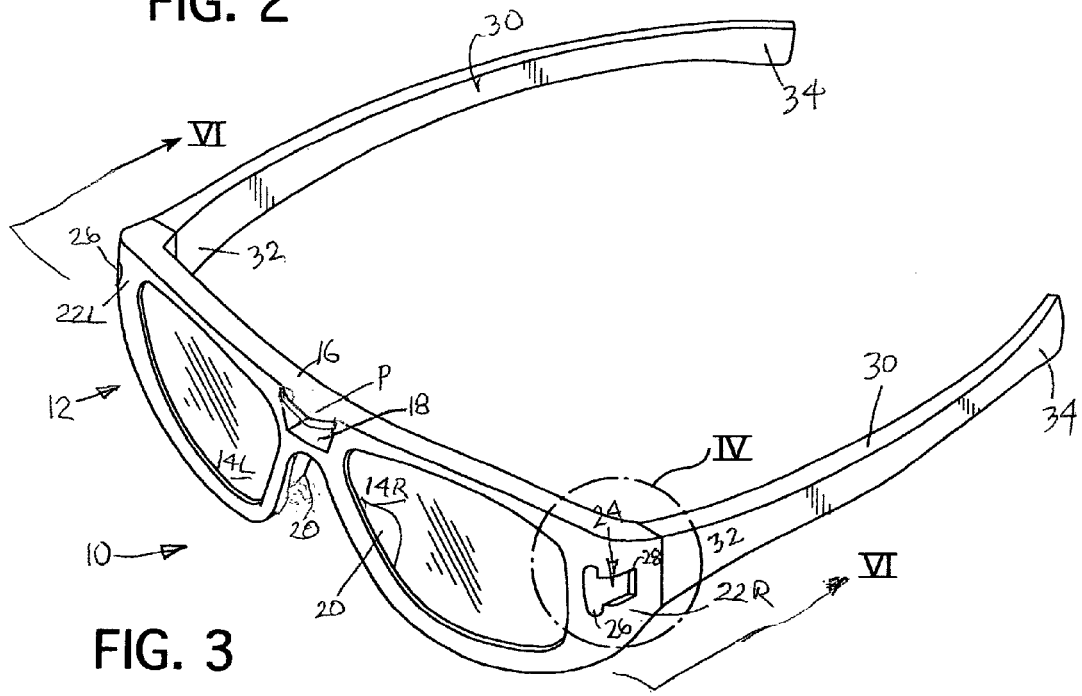
FIG. 3 is a perspective view from the left upper corner of that same eyeglass frame.
Figure 4:
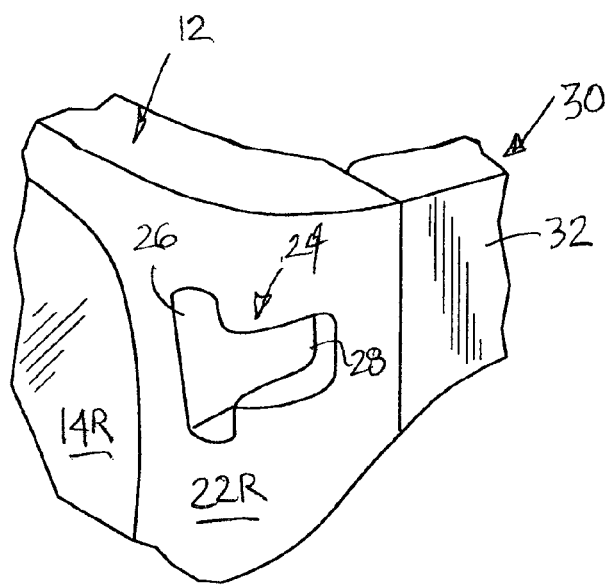
FIG. 4 is an exploded view of the circle marked "IV" in FIG. 3.
Figure 5:
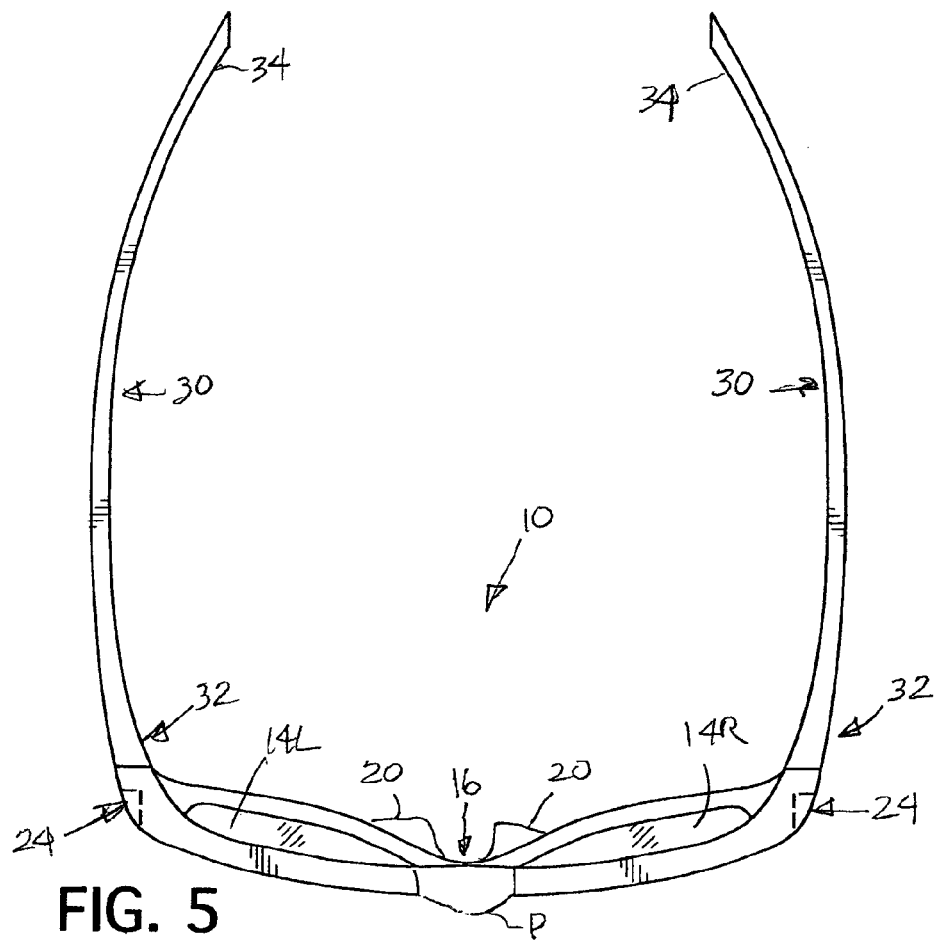
FIG. 5 is a top plan view of the glass frame from FIGS. 1-3 with one version of corner notch recess shown in dashed lines.

Conversely, the wider, obtusely angled alternative of FIG. 7A2 will require positioning that temple arm 230 more closer to its main body 212, and the right corner 221R of same before it can be safely rotated about its connector pin 250 for adequate securing within that variation's removable hinge frame assembly.

Figure 8:
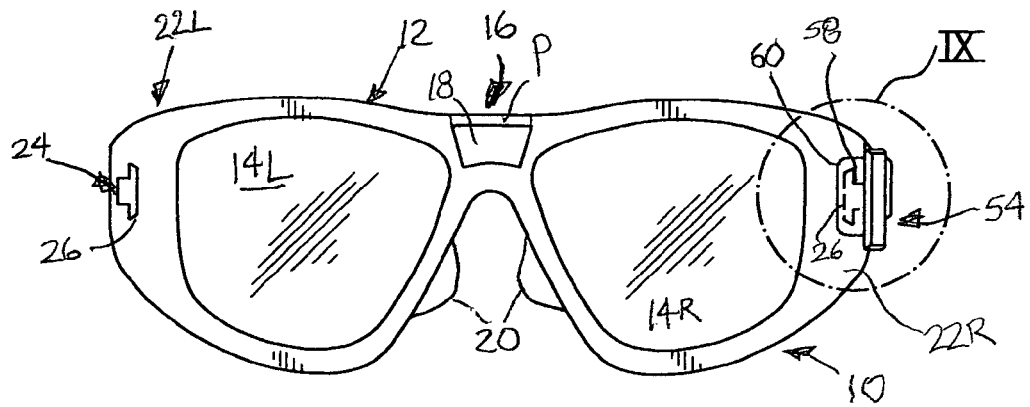
FIG. 8 is a front plan view of frame with a strap connector inserted into the frame's right corner notch recess.
Figure 9:
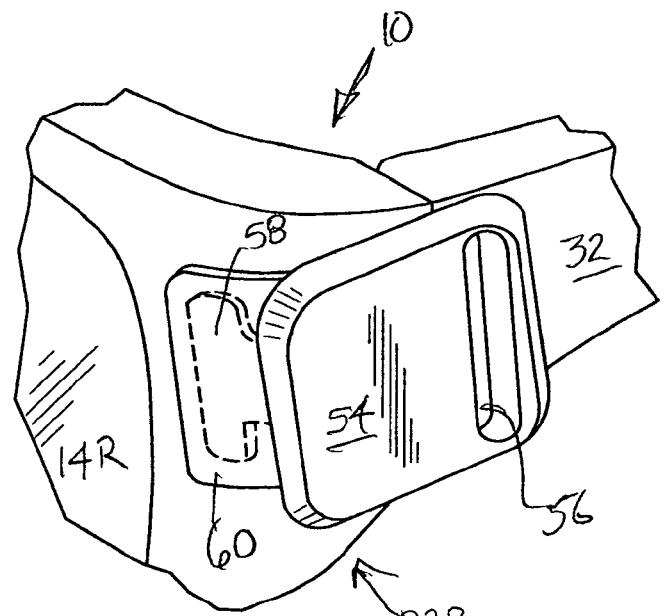
FIG. 9 is a perspective view of the circle marked "IX" in FIG. 8.
Figure 10:
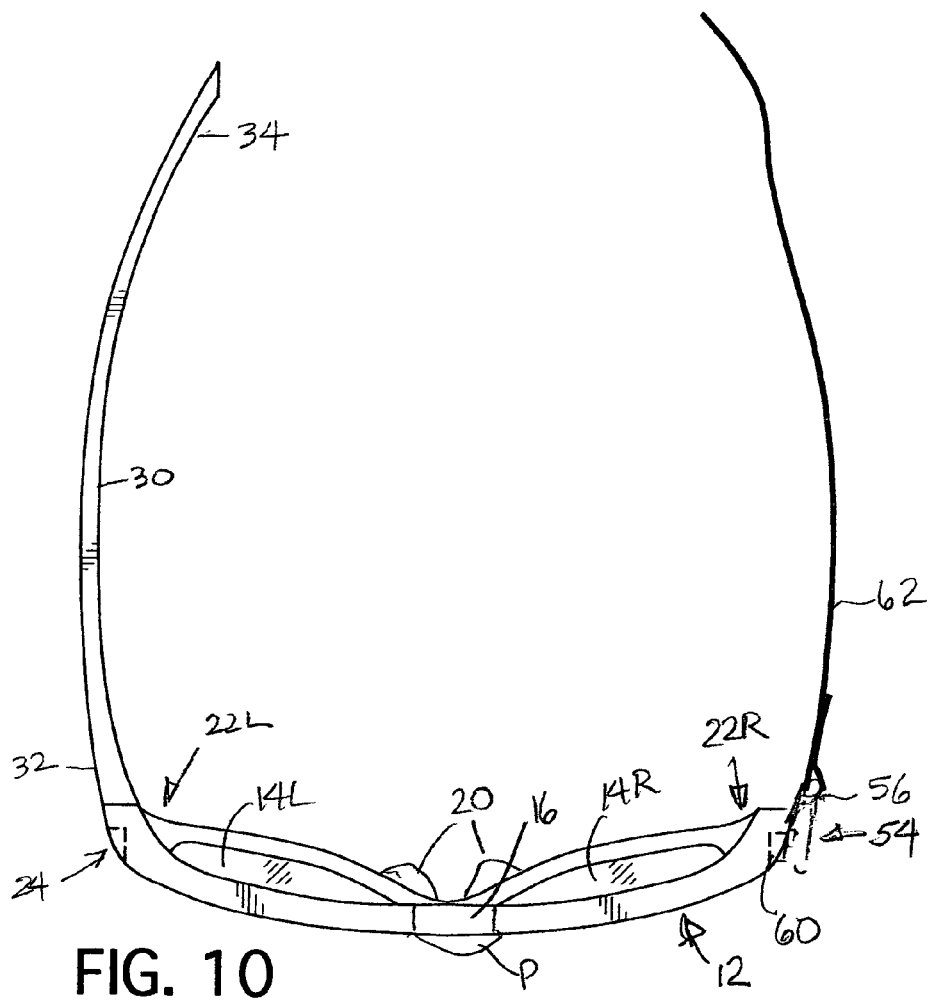
FIG. 10 is in top plan view of glass frame showing alternate wearing options, namely a temple arm hinged into the frame's left corner and strap protrusion (with strap affixed) into a notch recess on the frame's right corner.
Figure 11:
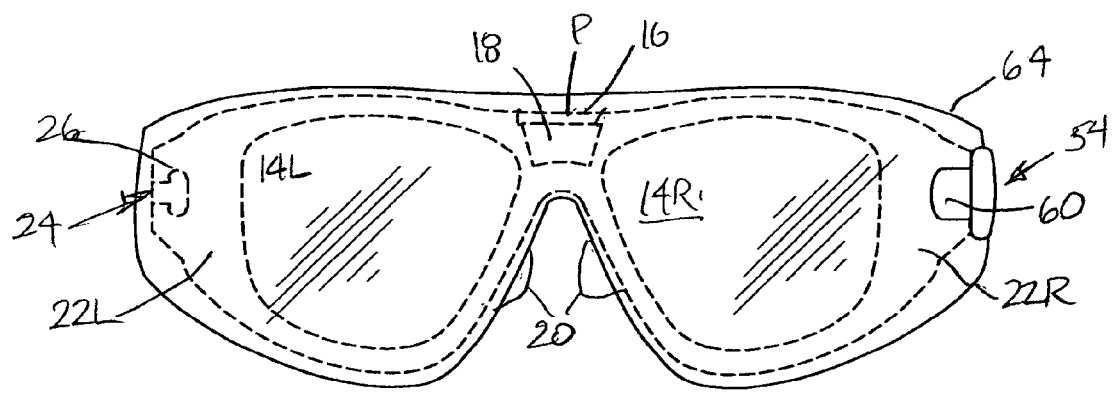
FIG. 11 is a front plan view of glass frame with a full safety shield and strap protrusion extending from the right corner only for illustration purposes.
Figure 12A:
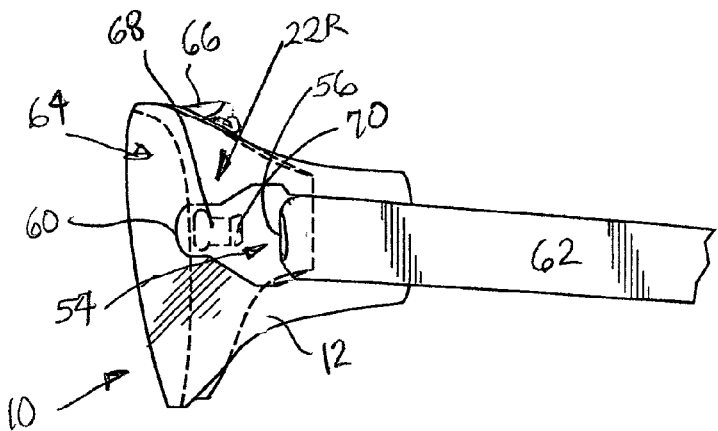
FIG. 12A is a left plan view of the frame-safety shield from FIG. 11.
Figure 12B:
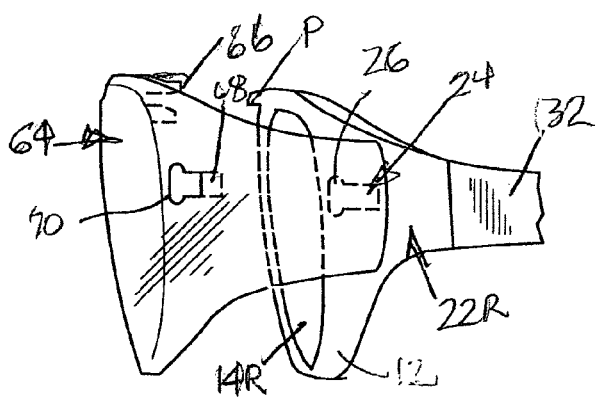
FIG. 12B is a left plan view of a full shield affixed to a frame with a left temple arm.
Figure 13:
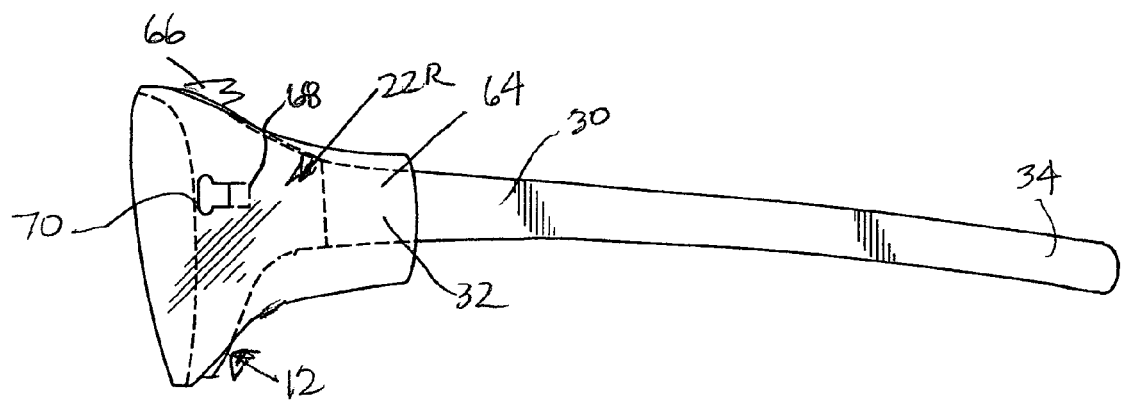
FIG. 13 is a left plan view of the shield fully affixed to the frame from FIG. 12B.
Figure 14:
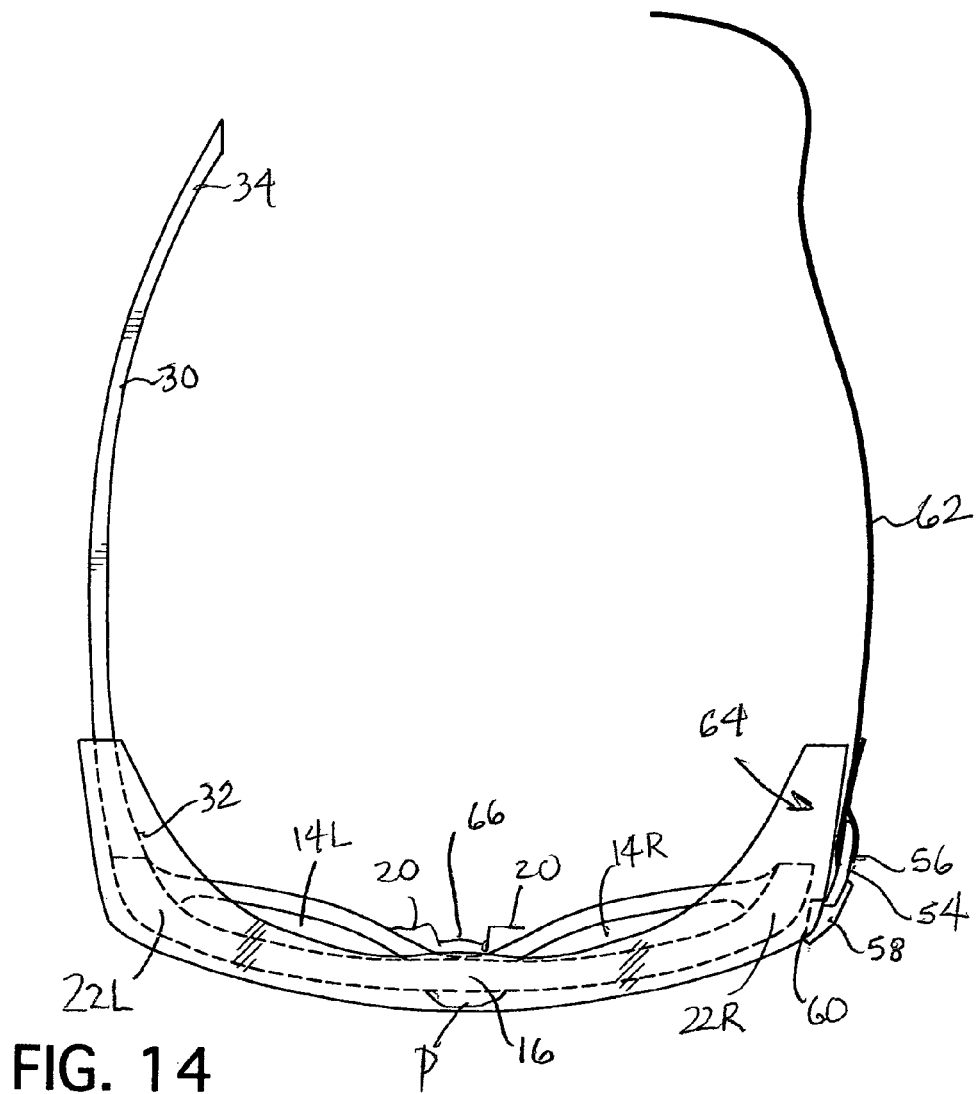
FIG. 14 is a top plan view of glass frame and full safety shield showing alternate wearing options, namely a temple arm hinged into the frame's left corner and strap protrusion (with strap affixed) into the safety shield's right corner.
Figure 15:
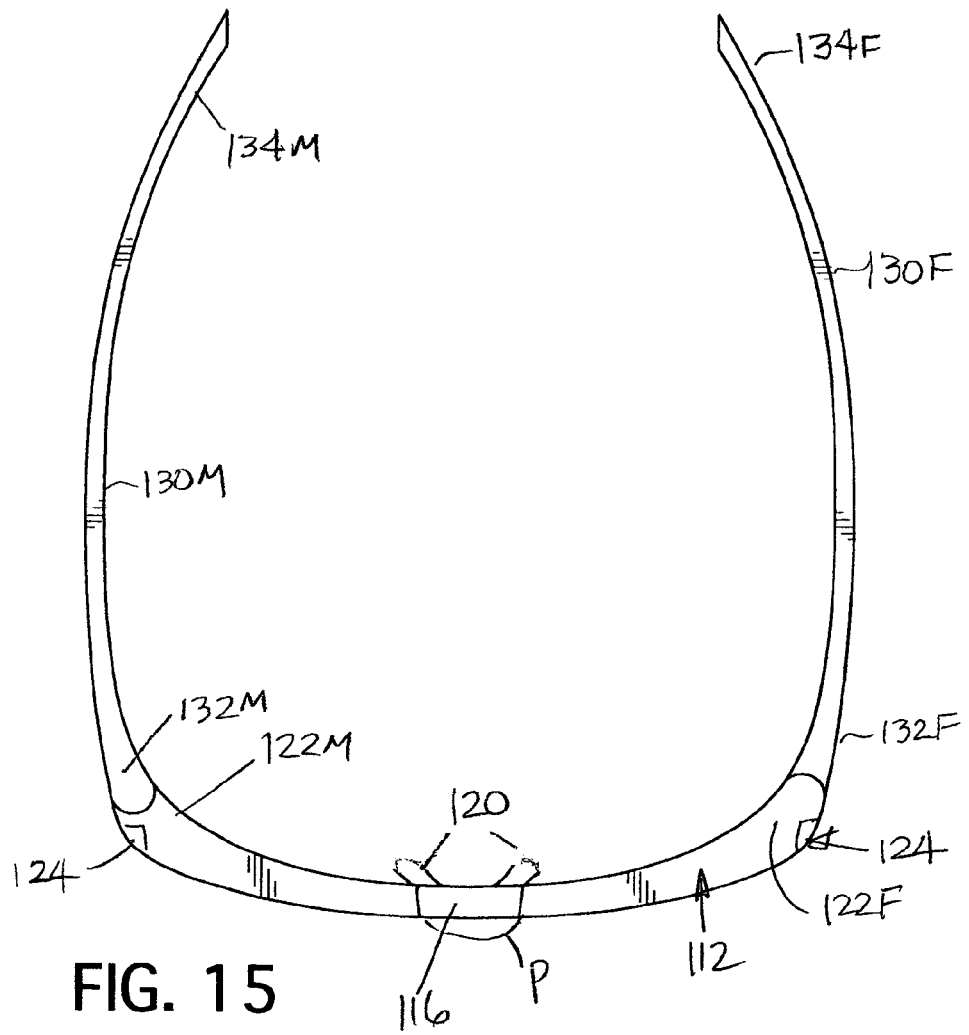
FIG. 15 is a top plan view of second frame according to this invention, said embodiment having a male-based temple hinged at one corner and female-based temple hinged to the opposite corner.
Figure 16:
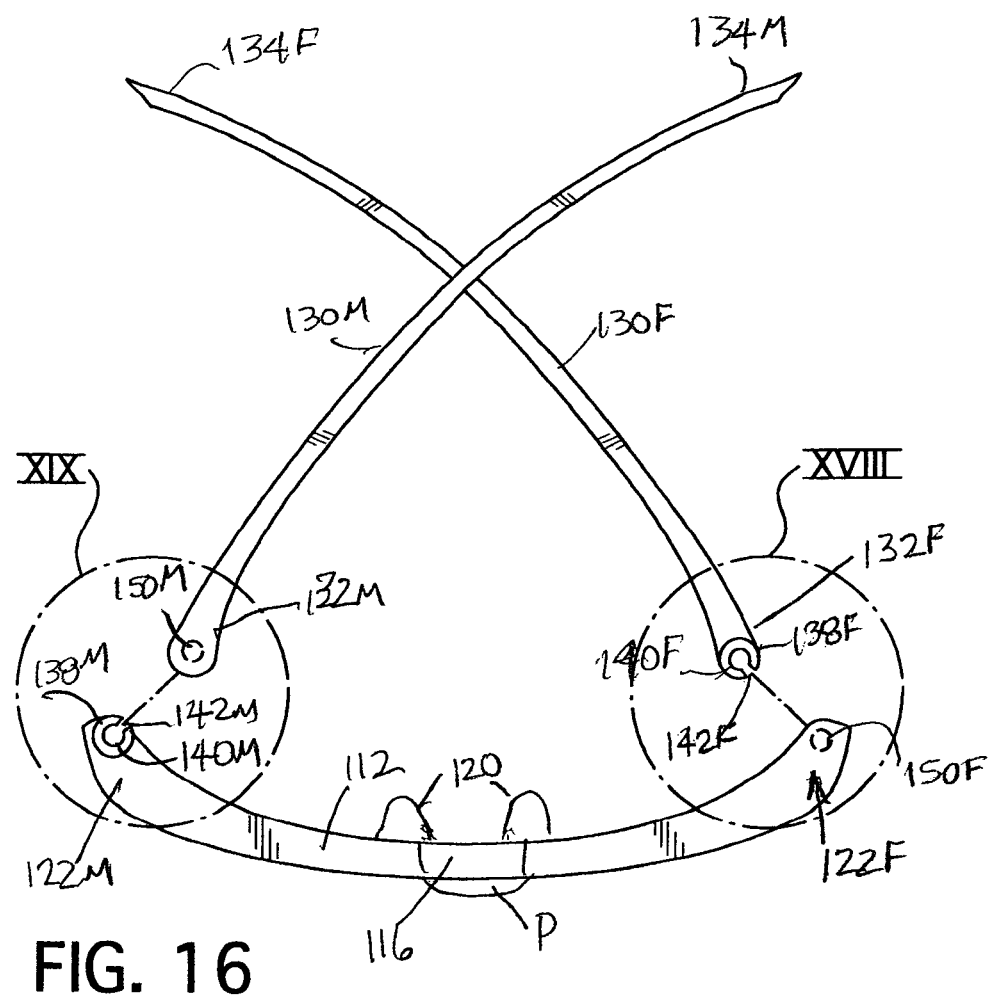
FIG. 16 is a top plan, exploded view the second embodiment from FIG. 15 showing a female temple connection to the frame's right corner and male temple connection to the opposite corner.
Figure 17A:
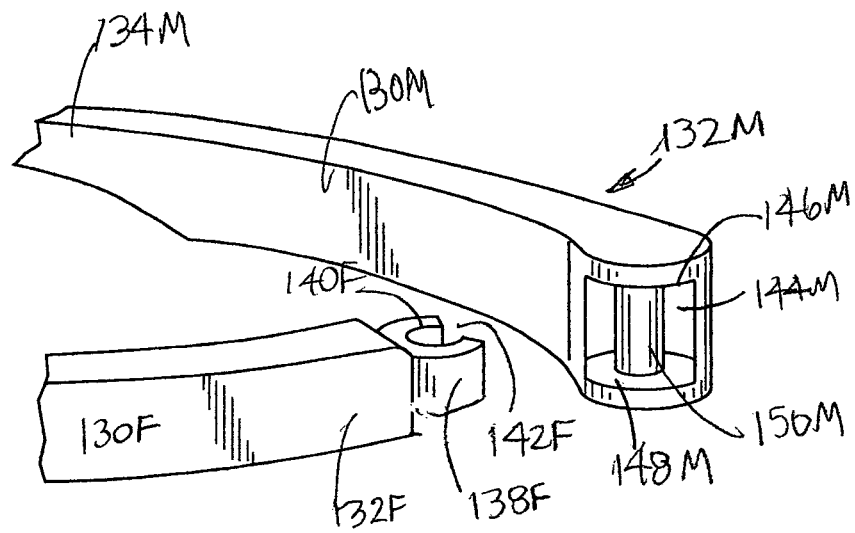
FIGS. 17A and B sequentially show perspective views of male and female temple arms interconnecting after removal from the glass frame of FIG. 15.
Figure 17B:
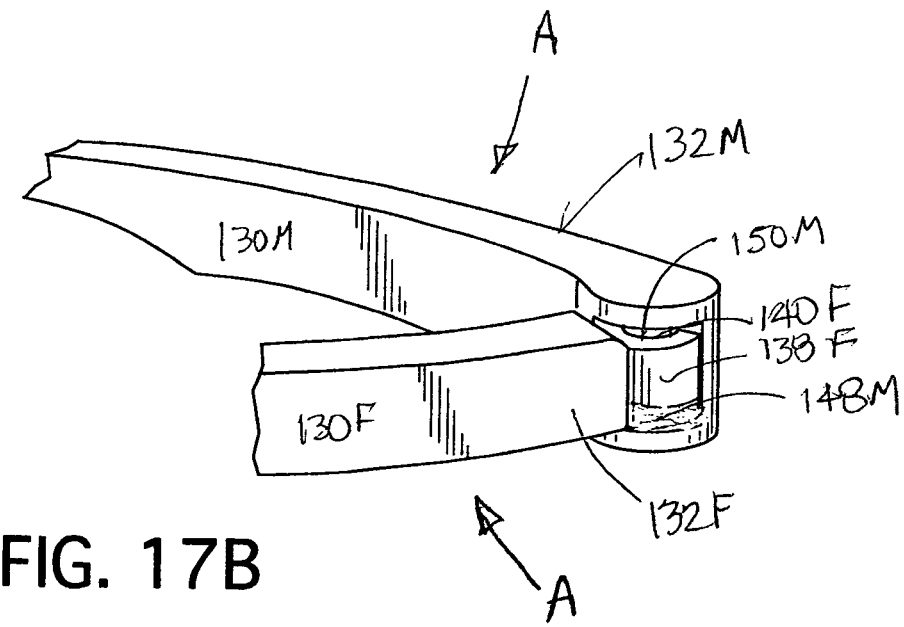
Figure 18:
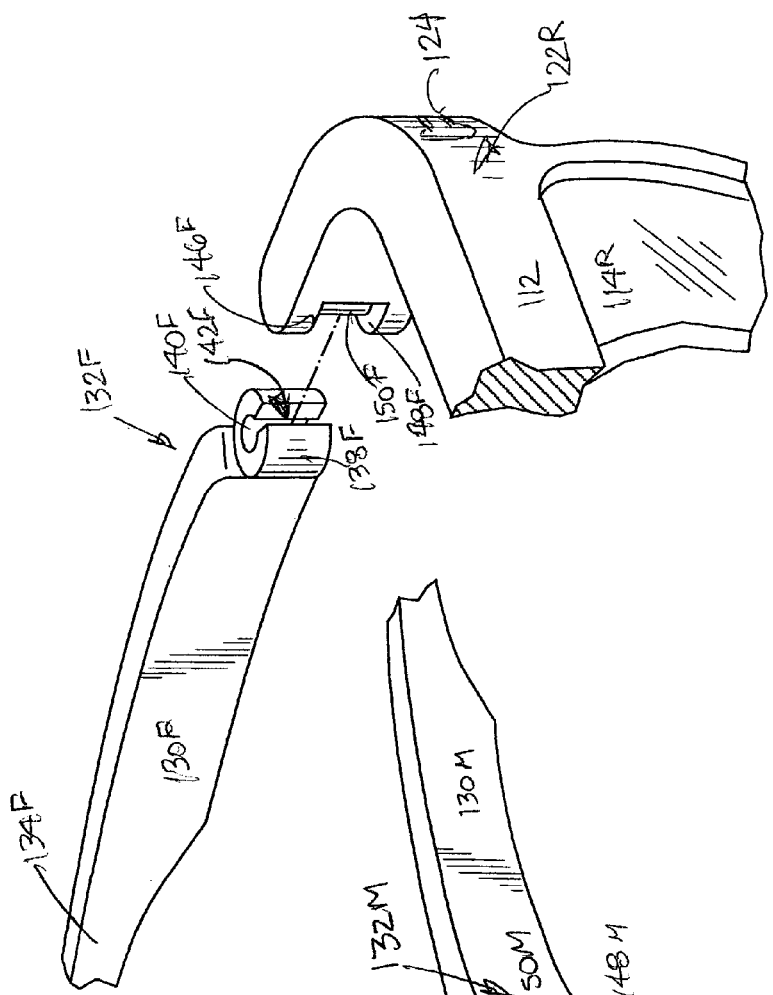
FIG. 18 is an exploded, perspective view of the right side, female temple connection from circle "XVIII" of FIG. 16.
Figure 19:
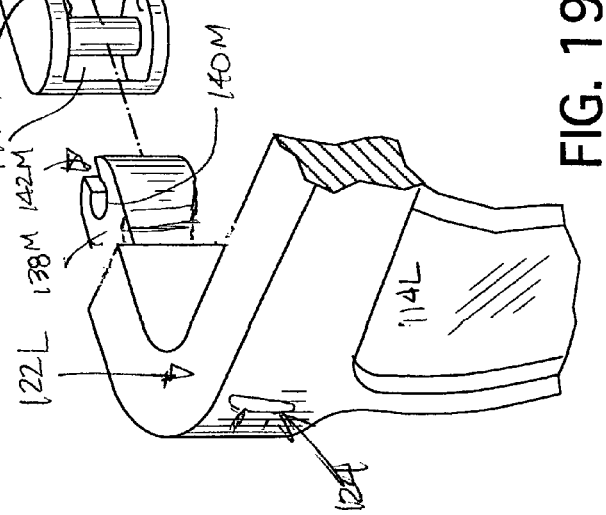
FIG. 19 is an exploded, perspective view of the left side, male temple connection from circle "XIX" of FIG. 16.

In FIGS. 8-10, there is shown one alternate means for wearing frame 12 of this invention. Particularly, this embodiment shows a strap connector element 54 on its right side (it being understood that strap connectors may extend from either or both frame corners in the alternative). The representative connector of FIGS. 8 and 9 consist of a main body having a protrusion 58 sized and shaped to fit snugly in the specially shaped recess 24 of each frame corner 22L and R. While shown as having a similar configuration to the main body's T-shaped front 26, it is to be understood that still other shapes and sizes may suffice. Strap connector 54 has an aperture 56 through which one of many varieties of head straps 62 may be thread, including but not limited to a single elastic strap and/or multiple straps extending from both frame ends before being joined together behind the wearer's end, etc. To better protect that connector from loosening or other undue interference, protrusion 58 may be held in place beneath or behind its own cover 60.

FIGS. 11-14 show yet another aspect of this invention, one in which there may be situated a separate safety shield for use by the wearer when his/her main frame 12 is not installed in the protective mask. In that case, the wearer's eyes may be further guarded with side shield variations (not shown) or with a full face shield 64. The latter variety should have multiple attachment means to each frame of this invention. For this reason, full shields 64 would be equipped with a center clip set 66 specifically designed to interact (or engage) with the protrusion P between lenses 14L and R when the assembly is not otherwise affixed inside a protective safety mask. This centrally located, shield connection means is best supplemented with a pair of side connectors that make use of the notched recesses 24 in main frame 12. Particularly, on the inside corners to full shield 64 (or analogously, to the insides of both side shields only), there is at least one interior extending barb or protrusion (partially visible as element 68) for engaging with recesses 24. Ideally, the exteriors to full shield 64 (or side shield pairs, not shown) may include yet another outer recess 70 so that the strap assembly from above may be moved from outside just the frame to outside the frame and shield, in combination.

FIGS. 15-19 show an alternate embodiment of this invention (hence the common element numbering in the next hundred series). Therein, main frame 112 is provided with one female hinged temple arm 130F and one male hinged arm 130M. As drawn, the female temple extends along the right side of main frame 112 and the male along the left; though it is be understood that a full reversal of sides is also anticipated hereby. The particular components to each hinge set are better seen in the top, exploded view of FIG. 16 and with the respective enlarged, perspective redraws of same at respective FIG. 18, for the female temple end; and 19, for the male end. What makes this alternative embodiment more valuable is that with a male and female hinge set, one is able to achieve temple arm interlocking (for safekeeping and less risk of damage/loss) when NOT in use, said interlocking feature being sequentially shown by movement of the two disconnected temple arms towards each other (and in the direction of moving arrows A) in FIGS. 17A and B after the two temple arms are properly positioned (i.e., one is rotated 180 degrees; and its angle duly aligned to slide in and about the oppositely-shaped hinge partner).

Figure 20:
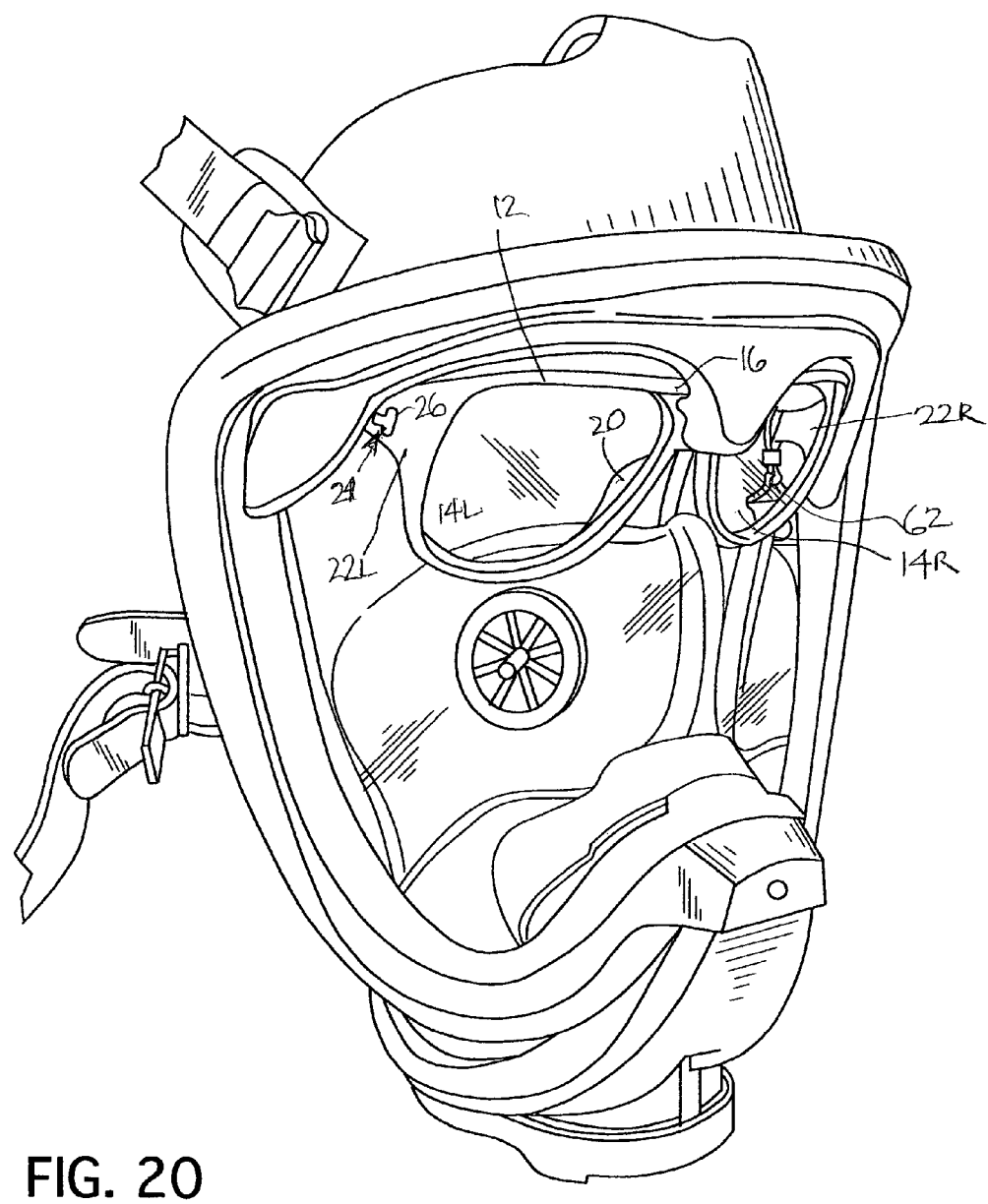
FIG. 20 is a front perspective view of one representative mask, MSA's Elite model, to which the glass frame of this invention has been inserted.

Finally, with respect to accompanying FIG. 20, there is shown a representative MSA Elite model mask 75 with its corrective lens frame 12 duly added. The protective mask insert for holding that frame in the mask is, unfortunately, not visible in this view. It would, however, simply attach to the mask interior by several suitable means before the vision correcting frames are affixed to same. If need be, the mask wearer may leave the strap assembly on his/her frame while still wearing the frame in this mask arrangement. As seen in FIG. 20, a strap 62 can be left on the frames and still not interfere with the mask wearer's vision, or critical respiratory seal for that matter.

While the invention has been described in conjunction with several embodiments, it is to be understood that many alternatives, modifications, and variations will be apparent to those skilled in the art in light of the foregoing description.

Accordingly, this invention is intended to embrace all such alternatives, modifications, and variations which fall within the spirit and scope of the appended claims.

What is claimed is:

1. A hinge and side arm combination for an eyeglass frame which combination permits repeated connecting and disconnecting of the side arm to the hinge, said eyeglass frame having a hinge and side arm combination at each frame end,
    (a) each hinge comprising: a back wall, a top region, a bottom region and a connector pin between the top and bottom regions for forming an arcuate-shaped gap between the back wall and the connector pin; and
    (b) each side arm comprising: an elongate side that terminates in a region fitting over an ear of the eyeglass frame wearer; and an arcuate region for fitting into the gap between the back wall and connector pin of the hinge but only when: (i) positioned at an angle between about 20 and 75 degrees relative to the eyeglass frame; (ii) slid into the gap; and (iii) rotated about the connector pin in a direction away from the eyeglass frame.

2. The hinge and side arm combination of claim 1, wherein the arcuate region is fitted for connecting to the hinge when positioned between about 30 and 60 degrees relative to the eyeglass frame.

3. The hinge and side arm combination of claim 2, wherein the arcuate region is fitted for connecting to the hinge when positioned between about 40 and 50 degrees relative to the eyeglass frame.

4. The hinge and side arm combination of claim 1, wherein the connector pin of the hinge is substantially columnar.

5. The hinge and side arm combination of claim 4, wherein the connector pin has opposed flat sides.

6. The hinge and side arm combination of claim 1, wherein the arcuate region is more than about fifty-five percent (55%) of a circle in cross-section.

7. The hinge and side arm combination of claim 6, wherein the arcuate region is more than about seventy-five percent (75%) of a circle in cross-section.

8. The hinge and side arm combination of claim 1 which do not require snap fitting about the connector pin of the hinge.

9. An eyeglass frame with easily connecting/disconnecting side temple arms, said frame comprising:
    a main body with left and right lens holding areas, said main body having at opposite ends a hinge and temple arm combination with a first component of said combination including:
        a back wall, a top region, a bottom region and a columnar connector spaced between the top and bottom regions so as to form a gap between the back wall and the columnar connector;
    and a second combination component including:
        an arcuate region for fitting into the gap between the back wall and columnar connector of the first combination component but only when:
            (i) positioned at an angle between about 30 and 60 degrees relative to the main body,
            (ii) slid into the gap without having to snap about any portion of the columnar connector; and
            (iii) rotated into the gap away from the main body.

10. The eyeglass frame of claim 9 wherein at least one hinge and temple arm connection includes an elongate member that terminates at one end with a second combination component.

11. The eyeglass frame of claim 9 wherein both hinge and temple arm connections include an elongate member that terminates at one end with a second combination component.

12. The eyeglass frame of claim 9 wherein at least one hinge and temple arm connection includes an elongate member that terminates at one end with a first combination component.

13. The eyeglass frame of claim 12 wherein the elongate member with the first combination component and the elongate member with the second combination component are able to interconnect for storage when not connected to the eyeglass frame.

14. The eyeglass frame of claim 9 wherein the arcuate region is fitted for connecting when positioned between about 30 and 60 degrees relative to the main body.

15. The eyeglass frame of claim 14 wherein the arcuate region is fitted for connecting when positioned between about 40 and 50 degrees relative to the main body.

16. The eyeglass frame of claim 9 wherein the arcuate region is between about fifty-five percent (55%) to seventy-five percent (75%) of a circle in cross-section.

17. The eyeglass frame of claim 9 wherein the main body includes a notched recess on an exterior to each opposite end, and said eyeglass frame further includes at least one of:
    (a) a full front shield for connecting to the main body in one or more of:
        (i) a central region between the left and right lens holding areas; and
        (ii) a protrusion sized or shaped for fitting within the notched recess at each opposite end;
    (b) a pair of side safety shields, each side shield having a protrusion sized or shaped for fitting in the notched recess at each opposite end; and
    (c) a strap having a connector at opposite ends, said connector sized or shaped to fit in the notched recess of the main body exterior.

18. An eyeglass frame with multiple wearer connections, said frame comprising:
    (a) a main body having left and right lens holding areas, said main body having a hinge connect receiver at opposite ends, each hinge connect receiver comprising a back wall, a top region, a bottom region and a columnar connector spaced between the top and bottom regions so as to form a gap between the back wall and the columnar connector;
    (b) a pair of side temple arms, each arm terminating at one end in an arcuate region for fitting into the gap between the back wall and columnar connector of the hinge connect receiver but only when:
        (i) positioned at an angle between about 30 and 60 degrees relative to the main body,
        (ii) slid into the gap without snapping to any portion of the columnar connector; and
        (iii) rotated into the gap away from the main body; and
    (c) said main body further comprising at opposite ends one or more elastic strap connectors for the wearer to use with a strap for positioning about the wearer's head when the side temple arms are not connected to the main body.

19. The eyeglass frame of claim 18 wherein the main body includes a notched recess on an exterior to each opposite end, and said eyeglass frame further includes at least one of:
    (a) a full front shield for connecting to the main body in one or more of:
        (i) a central region between the left and right lens holding areas; and
        (ii) a protrusion sized or shaped for fitting within the notched recess at each opposite end; and (b) a pair of side safety shields, each side shield having a protrusion sized or shaped for fitting in the notched recess at each opposite end.

20. In a spectacle kit article comprising: (i) a spectacle frame for holding two lenses, a bridge piece, a receiver, and notch attachment means for connecting a holding strap at each horizontal end of said spectacle frame; (ii) a removable protective mask insert for placement in a conventional, commercially available full face respirator or self contained breathing mask, said protective mask insert having an insert clip at a central location of said protective mask insert; and (iii) detachable means for attaching said spectacle frame to said removable protective mask insert, wherein said spectacle frame firmly attaches to said insert clip by snapping said receiver onto a central protrusion on said insert clip, the improvement wherein:

said spectacle frame further comprises a hinge and side arm combination at each horizontal end, (a) each hinge comprising: a back wall, a top region, a bottom region and a connector pin between the top and bottom regions for forming an arcuate-shaped gap between the back wall and the connector pin; and (b) each side arm comprising: an elongate side that terminates in a region fitting over an ear of the eyeglass frame wearer; and an arcuate region for fitting into the gap between the back wall and connector pin of the hinge but only when: (i) positioned at an angle between about 20 and 75 degrees relative to the front piece; (ii) slid into the gap; and (iii) rotated about the connector pin in a direction away from the front piece for use by the spectacle kit wearer.

* * * * *